(12) United States Patent
Telljohann et al.

(10) Patent No.: US 10,748,360 B2
(45) Date of Patent: *Aug. 18, 2020

(54) ANTENNA DIVERSITY IMPLEMENTATION FOR WIRELESS LOCKS

(71) Applicant: Schlage Lock Company LLC, Carmel, IN (US)

(72) Inventors: Brian A. Telljohann, Indianapolis, IN (US); Ron M. Kielkowski, Colorado Springs, CO (US); Frank A. Nardelli, Indianapolis, IN (US); Russell L. Steiner, St. Helen, MI (US)

(73) Assignee: Schlage Lock Company LLC, Carmel, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/189,044

(22) Filed: Nov. 13, 2018

(65) Prior Publication Data
US 2019/0088056 A1  Mar. 21, 2019

Related U.S. Application Data

(63) Continuation of application No. 15/786,253, filed on Oct. 17, 2017, now Pat. No. 10,127,753, which is a
(Continued)

(51) Int. Cl.
*G07C 9/00* (2020.01)
*H04B 7/08* (2006.01)
(Continued)

(52) U.S. Cl.
CPC ............ *G07C 9/00309* (2013.01); *G07C 9/28* (2020.01); *H04B 7/0811* (2013.01); *H04W 4/70* (2018.02);
(Continued)

(58) Field of Classification Search
CPC ....... B60R 25/24; G01S 3/023; G06K 7/0008; G07C 9/00111; G07C 9/00309;
(Continued)

(56) References Cited

U.S. PATENT DOCUMENTS 5,131,006 A 7/1992 Kamerman et al.
6,483,884 B1 11/2002 Shen et al.
(Continued)

OTHER PUBLICATIONS

International Search Report; International Searching Authority; US Patent and Trademark Office; International Application No. PCT/US2016/035045; dated Nov. 4, 2016; 4 pages.
(Continued)

*Primary Examiner* — Stephen R Burgdorf
(74) *Attorney, Agent, or Firm* — Taft Stettinius & Hollister LLP

(57) ABSTRACT

An electronic lock system including an access control device configured to provide system instructions, an interface module electrically coupled to the access control device and configured to transmit RF signals in response to system instructions received from the access control device, and a plurality of wireless electronic door locks each configured to wirelessly communicate with the interface module. Each of the wireless electronic door locks includes a controller and a wireless receiver operatively connected to the controller, the wireless receiver including a first antenna defined as a circuit board trace and a second antenna, spaced from the first antenna and defined as a circuit board trace. Each of the first antenna and the second antenna include one of a monopole antenna and a fractal antenna. The controller is configured to switch between the first antenna and the second antenna to receive a wireless signal having a greater signal strength.

21 Claims, 8 Drawing Sheets

Related U.S. Application Data continuation of application No. 15/162,782, filed on May 24, 2016, now Pat. No. 9,792,744.

(60) Provisional application No. 62/169,069, filed on Jun. 1, 2015.

(51) Int. Cl.
*H04W 4/70* (2018.01)
*G07C 9/28* (2020.01)
*H04W 4/80* (2018.01)

(52) U.S. Cl.
CPC .... *H04W 4/80* (2018.02); *G07C 2009/00769* (2013.01)

(58) Field of Classification Search
CPC ........ G07C 2009/00769; H01Q 1/2225; H04B 7/0608; H04B 7/0667; H04B 7/0811; H04B 17/102; H04L 27/2656; H04W 4/70; H04W 4/80; H04W 16/28
USPC ...................................................... 340/5.61
See application file for complete search history.

(56) References Cited

U.S. PATENT DOCUMENTS

| | | | |
|---|---|---|---|
| 6,907,094 B2 | 6/2005 | Matsui et al. | |
| 7,088,965 B1 | 8/2006 | Ngan | |
| 7,277,062 B1 | 10/2007 | Loyet | |
| 7,446,644 B2 * | 11/2008 | Schaffzin | G07C 9/00182 340/5.6 |
| 7,515,893 B2 | 4/2009 | Lyons et al. | |
| 7,535,971 B2 | 5/2009 | Yen et al. | |
| 7,683,788 B2 | 3/2010 | Turner | |
| 8,064,861 B2 | 11/2011 | Ruijter | |
| 8,351,888 B1 | 1/2013 | Kopikare et al. | |
| 8,428,541 B2 | 4/2013 | Moorti et al. | |
| 8,488,727 B1 | 7/2013 | Feng et al. | |
| 8,613,027 B2 | 12/2013 | Jeffery et al. | |
| 8,665,980 B2 | 3/2014 | Liu et al. | |
| 9,007,173 B2 * | 4/2015 | McIntyre | G07C 9/00309 340/5.61 |
| 9,196,104 B2 | 11/2015 | Dumas et al. | |
| 9,218,696 B2 * | 12/2015 | Dumas | E05B 47/00 |
| 9,761,072 B2 * | 9/2017 | Arfwedson | G07C 9/00309 |
| 9,940,766 B2 * | 4/2018 | Toivonen | G07C 9/00309 |
| 10,453,281 B1 * | 10/2019 | Lopez | H04B 17/318 |
| 2003/0185169 A1 | 10/2003 | Higgins | |
| 2004/0041692 A1 * | 3/2004 | Lyons | B60R 25/24 340/5.64 |
| 2004/0266375 A1 * | 12/2004 | Li | H04B 7/0811 455/140 |
| 2006/0164208 A1 * | 7/2006 | Schaffzin | G07C 9/00182 340/5.64 |
| 2008/0227545 A1 | 9/2008 | Cho et al. | |
| 2009/0066505 A1 | 3/2009 | Jensen et al. | |
| 2009/0258622 A1 | 10/2009 | Ruijter | |
| 2010/0027604 A1 | 2/2010 | Vaidyanathan et al. | |
| 2010/0056191 A1 | 3/2010 | Eldering | |
| 2010/0202327 A1 | 8/2010 | Mushkin et al. | |
| 2010/0208894 A1 * | 8/2010 | True | B60R 25/24 380/270 |
| 2011/0148585 A1 | 6/2011 | Bae et al. | |
| 2011/0156976 A1 | 6/2011 | Neto et al. | |
| 2012/0099474 A1 * | 4/2012 | Gauthier | H04B 7/0667 370/252 |
| 2012/0114025 A1 | 5/2012 | Gauthier | |
| 2013/0101231 A1 | 4/2013 | Cok | |
| 2013/0102316 A1 | 4/2013 | Ngai et al. | |
| 2013/0241694 A1 * | 9/2013 | Sharma | G08C 17/02 340/5.64 |
| 2014/0292481 A1 | 10/2014 | Dumas et al. | |
| 2015/0102904 A1 | 4/2015 | Oh et al. | |
| 2015/0332530 A1 | 11/2015 | Kishita | |
| 2016/0248484 A1 | 8/2016 | Sayeed et al. | |
| 2016/0350992 A1 | 12/2016 | Telljohann et al. | |

OTHER PUBLICATIONS

Written Opinion; International Searching Authority; US Patent and Trademark Office; International Application No. PCT/US2016/035045; dated Nov. 4, 2016; 9 pages.

Literature, Atmel Corporation web site, www.atmel.com, issue 8158B-AVR-07/08, Title "AVR2021: AT86RF231 Antenna Diversity", Amtel Corporation, San Jose, CA., 2008, pp. 1-20.

Lee, J. et al., Improved Modeling of IEEE 802.11a PHY Through Finegrained Measurements (Abstract only), Advances in Wireless and Mobile Networks, Computer Networks, vol. 54, Issue 4, Mar. 19, 2010.

* cited by examiner

ANTENNA DIVERSITY IMPLEMENTATION FOR WIRELESS LOCKS

CROSS-REFERENCE TO RELATED APPLICATION

This application is a continuation of U.S. patent application Ser. No. 15/786,253 filed on Oct. 17, 2017 and issued as U.S. Pat. No. 10,125,539, which is a continuation of U.S.patent application Ser. No. 15/162,782 filed on May 24, 2016 and issued as U.S. Pat. No. 9,792,744, which claims the benefit of U.S. Provisional Application No. 62/169,069 filed on Jun. 1, 2015 , the contents of each application hereby incorporated by reference in their entirety.

FIELD OF THE INVENTION

The present disclosure relates to a security device, and more particularly to a door lock for securing a door.

BACKGROUND

Existing electronic lock systems are used to control access to various areas within a facility. Some systems employ wireless locks that communicate with an interface device, also known as a panel interface module, sufficiently proximate to the electronic locks to enable radio communication. The interface device is configured to monitor and control the state of a predetermined number of electronic locks, such that multiple interfaced devices can be required in a facility of a large size, since one interface device can be insufficient to monitor and control all of the electronic locks in the facility. Consequently, a number of interface devices are hardwired to a central controller, also known as an access control panel, and are connected to the computer system of the facility. In some facilities, more than one access control panel can be required. The computer system provides updates to the electronic locks through this radio communication network. However, the hardwired connection of the interfaces devices with the access control device can be expensive in large facilities, and creates concerns that the hardwiring is redundant with the existing wiring of the various area networks of the facility.

Some existing systems, when used inside a building or other structure, are susceptible to multi-path interference from door and hall passages, individuals, and architectural construction which limit the effective range of communication between the interface device and the electronic lock, each of which includes a receiver and a transceiver. Because of the multi-path interference, wireless locks sometimes have intermittent reception in indoor environments that makes the working range unpredictable. When the interface device and the electronic lock are in clear sight of each other, the electronic communication between the two can pass directly from one antenna to the other.

When there is no clear line-of-sight between the interface device and the electronic lock, the wireless electronic signal can reach the receiver of the electronic lock over multiple paths. The electronic signals traveling along multiple paths will be out of phase with other received signals and cause the multi-path distortion. In a typical office or industrial setting, multi-path distortion can be caused by the location of locks relative to interface device, and can even change dynamically as individuals move about the facility and doors are opened and closed. A receiver at the electronic lock attempts to decode the original signal from the distorted signal. If the distortion is too high, the receiver can fail to decode the transmitted signal and a communication error results. Because of this, the interface device must be relocated, usually closer to the electronic lock. In some cases, the number of interface devices must be increased to accommodate the facility, even though the interface device is not being fully utilized. What is needed, therefore, is an electronic door lock system which reduces signal distortion resulting from the configuration of the facility and the location of the electronic locks.

SUMMARY

In one embodiment, there is provided a system, components, devices, and methods for improving wireless communication in an electronic lock system, including communication between interface modules and electronic locks. Other embodiments include apparatuses, systems, devices, hardware, methods, and combinations improving communication to and from wireless locks by utilizing antenna diversity.

In one embodiment, there is provided a method of wireless electronic communication between an electronic door lock and an interface module. The method includes receiving a first wireless signal at a first antenna of the electronic door lock and receiving a second wireless signal at a second antenna of the electronic door lock. The method further includes determining the signal strength of each of the first signal and second signal and selecting one of the first antenna and the second antenna to receive one of the first signal and the second signal based on the determined signal strength.

In another embodiment, there is provided an electronic lock system including an electronic door lock having a controller, a wireless receiver operatively connected to the controller, and a first and second antenna each operatively connected to the receiver. An interface module includes a wireless transmitter wherein the wireless transmitter is configured to transmit wireless signals configured to modify an operating condition of the door lock. The controller is configured to execute stored program instructions to: (i) determine a first signal strength of a first RF signal received by the first antenna; (ii) determine a second signal strength of a second RF signal received by the second antenna; (iii) compare the first signal strength to the second signal strength to determine which is greater; and (iv) determine the content of the greater of the first signal and the second signal based on the compared first signal strength and the second signal strength.

In still another embodiment, there is provided an electronic lock system including an access control device configured to provide system instructions, an interface module electrically coupled to the access control device and configured to transmit RF signals in response to system instructions received from the access control device, and a plurality of wireless electronic door locks each configured to wirelessly communicate with the interface module. Each of the wireless electronic door locks includes a housing having disposed therein a controller and a wireless receiver operatively connected to the controller, the wireless receiver including a first antenna and a second antenna spaced from the first antenna.

BRIEF DESCRIPTION OF THE DRAWINGS

The description herein makes reference to the accompanying figures wherein like reference numerals refer to like parts throughout the several views; and wherein.

DESCRIPTION

Figure 1:
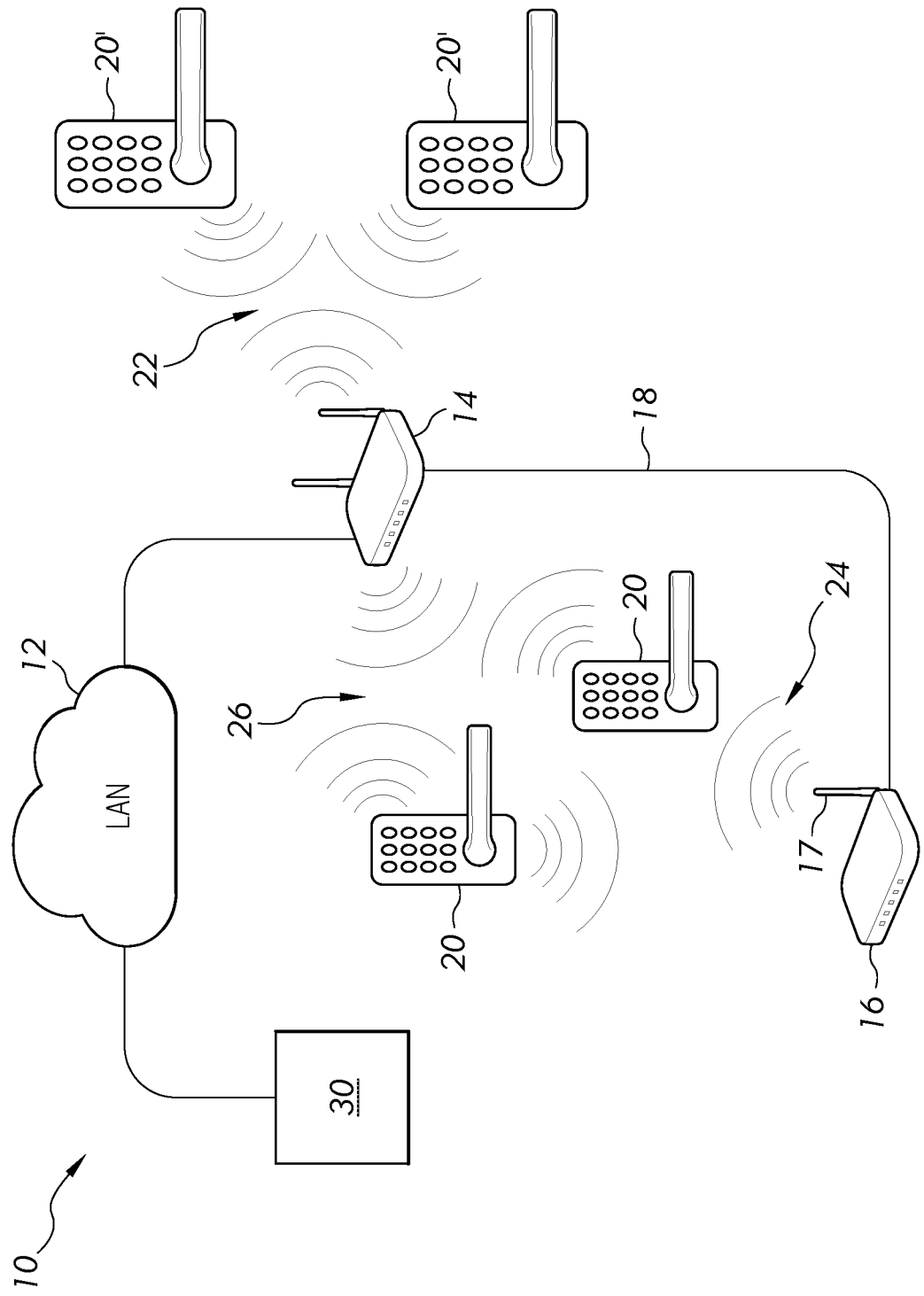
FIG. 1 is a schematic view of an example wireless lock system.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

FIG. 1 illustrates a plurality of access devices 20, in the form of wireless door locks, e.g. for use on an entrance door of a building, room or other part of a structure, that is configured to receive RF signals as part of an RF network 24. The door locks 20 are also configured to send and receive signals to computer network 12 via a WI-FI connection 26. It should be understood that many other devices, in different embodiments, send and receive RF signals as part of the RF network 24 and WI-FI connection 26 and the illustrated door lock is simply an example of one of these devices. The received RF signals received by the door lock are configured to change or modify the operating conditions or operating states of the door lock.

In the RF network 24, each door lock 20 acts as a communication node that receives a radio signal as a wakeup signal from an access control device 30 through its assigned bridge device 16, also described as a panel interface module. The access control device 30 is configured to provide system instructions and to receive signals from both the interface module 16. The door locks 20 communicate to send and receive information packets via the RF network or via a WI-FI connection 26 with computer network 12 to other devices in the system 10, such as the access control device 30. If a wakeup signal is not addressed to the door lock 20 in RF network 24, the door lock 20 ignores the wakeup signal. If the particular wakeup signal is addressed to the door lock 20 that interrogates it, the door lock 20 is awakened from a sleep mode and operates in a wake or run mode to communicate with access control device 30. In this arrangement, a battery operating life of each door lock 20, if a battery is included, is maintained since only door locks 20 that are designated to receive information from access control device 30 are awakened in real time for information downloads and uploads. The interrogation of the wakeup signal by door lock 20 occurs in conjunction with radio frequency communications, increasing battery life since the bridge device 16 transmits RF signals and the RF receiver of the access device 20 can operate at a lower power level when compared to standard wireless networks.

Figure 2:
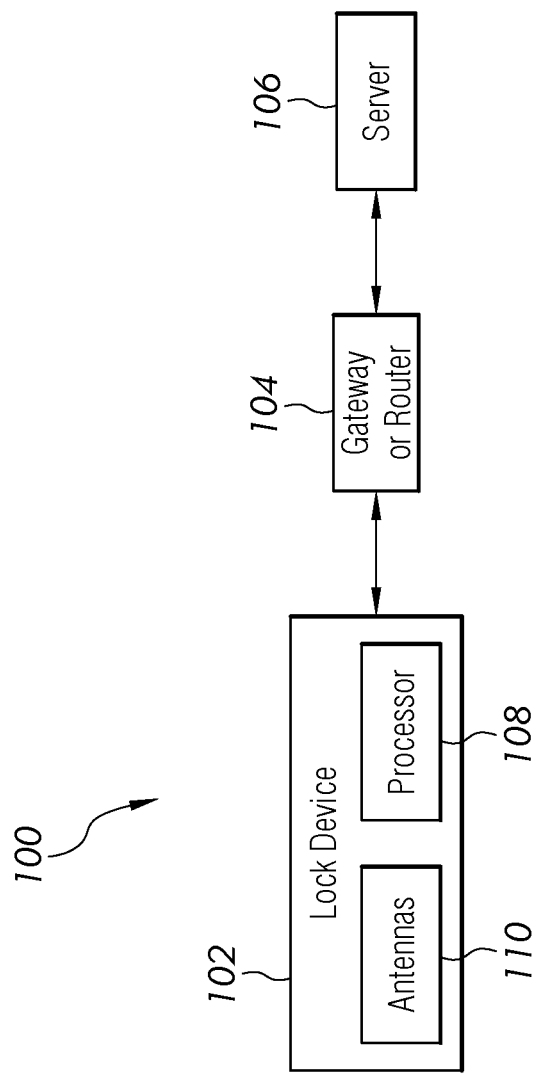
FIG. 2 is a block diagram of another example wireless lock system.

FIG. 2 illustrates a schematic view of another configuration of an electronic lock system 100. The system 100 includes an electronic lock device 102, such as the lock device 20. The lock device 102 includes a lock mechanism including, for instance, a bolt, a latch, or the like to secure a door. The lock device 102 includes at least one wireless transceiver, including a receiver and a transmitter, (e.g., WIFI, Bluetooth, RF etc.) to enable the lock device 102 to communicate with a gateway or router 104 which communicates with a server 106. The gateway or router, in one embodiment corresponds to the panel interface module 16. The lock device 102 and the server 106 communicate various information with each other such as access requests, user databases, and audits.

The lock device 102 includes a processor 108 that implements software controlled antenna diversity. The antenna diversity process is designed to minimize the additional length of the preamble and processor overhead so that there is a minimal effect on additional power consumption, thereby maintaining battery life. The lock device 102 includes two or more antennas 110 to receive a signal from the gateway or router 104. The diversity antennas of the lock device 102 are placed in different locations/orientations on a printed circuit board (PCB) and/or otherwise within or at the lock device 102 with firmware being used to sense which antenna has better reception signal strength and to automatically switch to one of the two or more antennas which receives the best signal.

The circuitry in the wireless transceiver of the lock device 102, in different embodiments, is configured to provide appropriate signal conditioning to transmit and receive desired information (data). The circuitry includes one or more of filters, amplifiers, limiters, modulators, demodulators, CODECs, digital signal processing, and/or different circuitry or functional components as would occur to those skilled in the art to perform the desired communications.

Figure 3:
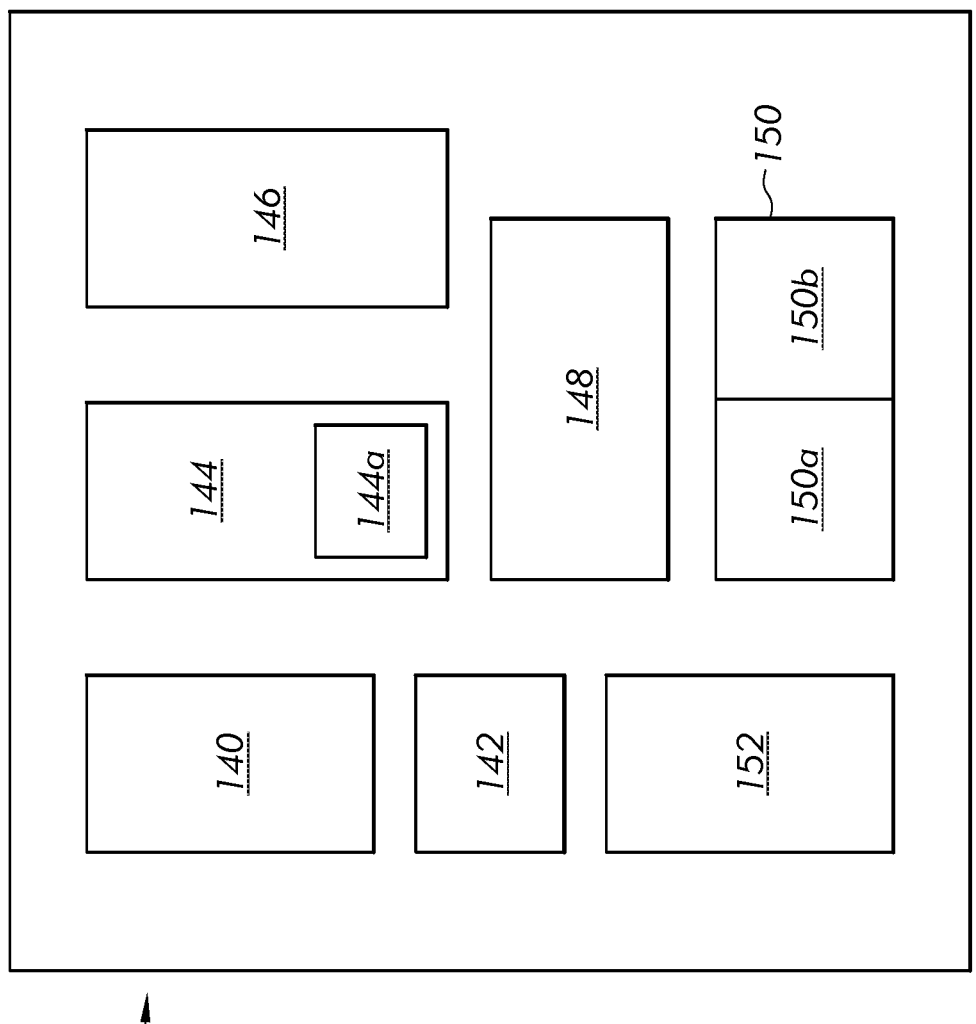
FIG. 3 is a block diagram of a lock device.

In one embodiment, the lock device 102 is a wireless electronic door lock, which is further shown in a block diagram form in FIG. 3. The lock device 102 includes a logic and memory module 140, a suitable power source 142, such as A/C power and/or battery power, a keyless entry system 144, a keyed entry mechanism 146, a locking mechanism 148, a multi-frequency transceiver 150 (receiver and transmitter), and a user interface 152.

The keyless entry system 144 includes a keypad 144a for entering an access code and other data. In other embodiments, other data entry systems may be used in place of the keypad, such as biometric entry, smart cards, infrared readers, etc. The keyless entry system 144, in different embodiments, includes a card reader for electronically reading an access code from a card carried by the user. The keyless entry system 144 communicates with the logic and memory module 140 that stores access codes, other user identification information, other data and carrying out the functions of the lock device 102. The logic and memory module 140, in different embodiments, stores individual user codes, where each user having access to the door is issued a unique user code that is stored and compared to input codes at the door to allow access decisions to be made at the door without transmissions over computer network 100.

In one embodiment, logic and memory module includes a processor that drives communications with RF network 24 and establishes WI-FI connection 26 through appropriate hardware on access device 20 and interface device 16. The logic and memory module 140 may further include an internal memory for storing credential data and audit data, and a real-time clock for determining times associated with access events. In addition, logic and memory module 140 is operable in a low power mode to preserve battery life. In one specific embodiment, logic and memory module 140 includes an advance reduced instruction set computer machine.

Software routines resident in the included memory are executed in response to the signals received and signals transmitted. The executed software routines include one or more specific applications, components, programs, objects, modules or sequence of instructions typically referred to as "program code". The program code includes one or more instructions located in memory and other storage devices which execute the operation of the lock device 102.

The keyed entry mechanism 146, in some embodiments, manually operates the locking mechanism 148, for example in case of power loss or other malfunction. The locking mechanism 148 of the lock device 102 includes locking features such as a sliding deadbolt, or other suitable locking mechanism coupled to a door handle or knob and/or to a key mechanism. In the illustrated construction, the locking mechanism 148 is power-driven, for example by a solenoid or an electric motor, to facilitate remote operation. The lock device 102 may also include a user interface 152 having visual components, such as a display, an LED light and/or an LCD screen, and/or audio components, such as a speaker or other sound-generating device.

Where the lock device 102 is part of a networked system 10, such as that described herein, functions that can be performed remotely through access control device 30 include, but are not limited to, confirming the status of a lock, such as whether the door lock is locked or unlocked, notifying the network of an attempted access, including whether the lock was accessed, when it was accessed and by whom, whether there were attempts at unauthorized access, and other audit information. In some constructions, the lock device 102 can also receive and execute a signal to unlock the lock, add or delete user codes for locks having such codes, and, if the door lock is paired with a suitable camera (not shown), transmit images of the person seeking entry. The lock device 102 can also be used to send a command to disarm an electronic alarm or security system, or to initiate a duress command from the keypad 144a, where the duress command may be utilized by the network to transmit a message to access control device 30 or other linked device, such as a computer terminal or mobile device, an electronic alarm or security system, or a networked computer server.

The keypad 144a can also be used to program and configure the operation of the lock device 102, such as adding access codes, deleting access codes, enabling audible operation, and setting relocking time delays. Additionally, the lock device 102 includes multi-frequency transceiver 150, or interface, that can include an RF module 150a including an antenna or programmable card for the reception and transmission of sub 1-GHz RF signals, a WI-FI module 150b configured to establish WI-FI connection 26 to and send and receive WI-FI signals to computer network 12, and all necessary electronic components required for the reception and generation of RF signals and WI-FI connection/disconnection with logic-memory module 140. The WI-FI interface with access control device 30 provides the same operation, programming, and configuration functionality as that afforded by the keypad 144a, in addition to a wide range of features including but not limited to audit information such as lock status reporting, lock operation reporting, lock battery status, and the like.

The logic and memory module 140; in different embodiments, is a programmable type, a dedicated, hardwired state machine; or any combination of these. The logic and memory module can include multiple processors, Arithmetic-Logic Units (ALUs), Central Processing Units (CPUs), Digital Signal Processors (DSPs), or the like. The logic and memory module may be dedicated to performance of the operations described herein or may be utilized in one or more additional applications. In the depicted form, logic and memory module is of a programmable variety that executes algorithms and processes data in accordance with operating logic as defined by programming instructions (such as software or firmware) stored in memory. In other embodiments, the memory is separate from the logic and is part of the logic or is coupled to the logic.

The memory is of one or more types, such as a solid-state variety, electromagnetic variety, optical variety, or a combination of these forms. Furthermore, the memory can be volatile, nonvolatile, or a combination of these types, and some or all can be of a portable variety, such as a disk, tape, memory stick, cartridge, or the like. In addition, memory can store data that is manipulated by the operating logic of the logic and memory 108, such as data representative of signals received from and/or sent to input/output device interface devices 16.

Figure 4:
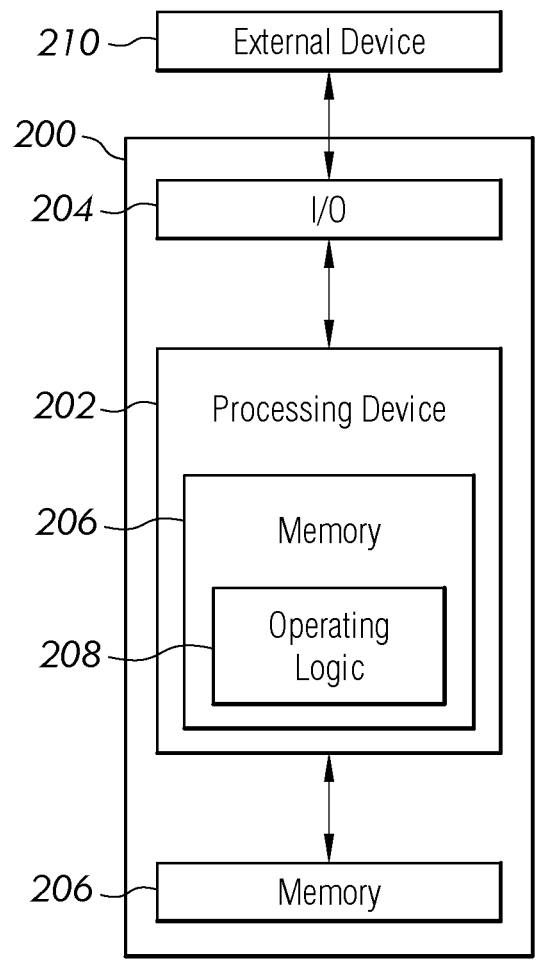
FIG. 4 is a block diagram of a lock device operatively coupled to an external device.

FIG. 4 illustrates another example of a lock device 200 including a processing device 202, which corresponds to the logic and memory module 140, and an input/output device 204, which corresponds to the transceiver 150. A memory 206 and operating logic 208 are also included in the processing device 202. Furthermore, the lock device 200 communicates with one or more external devices 210.

The input/output device 204 allows the lock device 200 to communicate with one or more external devices 210. For example, the input/output device 204 may be a transceiver, network adapter, network card, interface, or a port (e.g., a USB port, serial port, parallel port, an analog port, a digital port, VGA, DVI, HDMI, FireWire, CAT 5, or any other type of port or interface). The input/output device 204 may include hardware, software, and/or firmware. It is contemplated that the input/output device 204 will include more than one of these adapters, cards, or ports.

The external device 210 may be any type of device that allows data to be inputted or outputted from the lock device 200. For example, the external device 210 may be a switch, a router, a firewall, a server, a database, a mobile device, a networking device, a controller, a computer, a processing system, a printer, a display, an alarm, an illuminated indicator such as a status indicator, a keyboard, a mouse, or a touch screen display. Furthermore, it is contemplated that the external device 210 may be integrated into the lock device 200. It is further contemplated that there may be more than one external device in communication with the lock device 200.

Processing device 202 can be a programmable type, a dedicated, hardwired state machine, or any combination of these. Alternatively or additionally, operating logic 208 for processing device 202 is at least partially defined by hardwired logic or other hardware. Processing device 202 may include one or more components of any type suitable to process the signals received from input/output device 204 or elsewhere, and to provide desired output signals. Such components may include digital circuitry, analog circuitry, or a combination of both. Memory 206 may be of one or more types, such as a solid-state variety, electromagnetic variety, optical variety, or a combination of these forms.

The various aspects of the processes in the present application may be implemented in operating logic 208 as operations by software, hardware, artificial intelligence, fuzzy logic, or any combination thereof; or at least partially performed by a user or operator. In certain embodiments, operations represent software elements as a computer program encoded on a computer readable medium, wherein the processor of the lock device 102 performs the described operations when executing the computer program.

Figure 5:
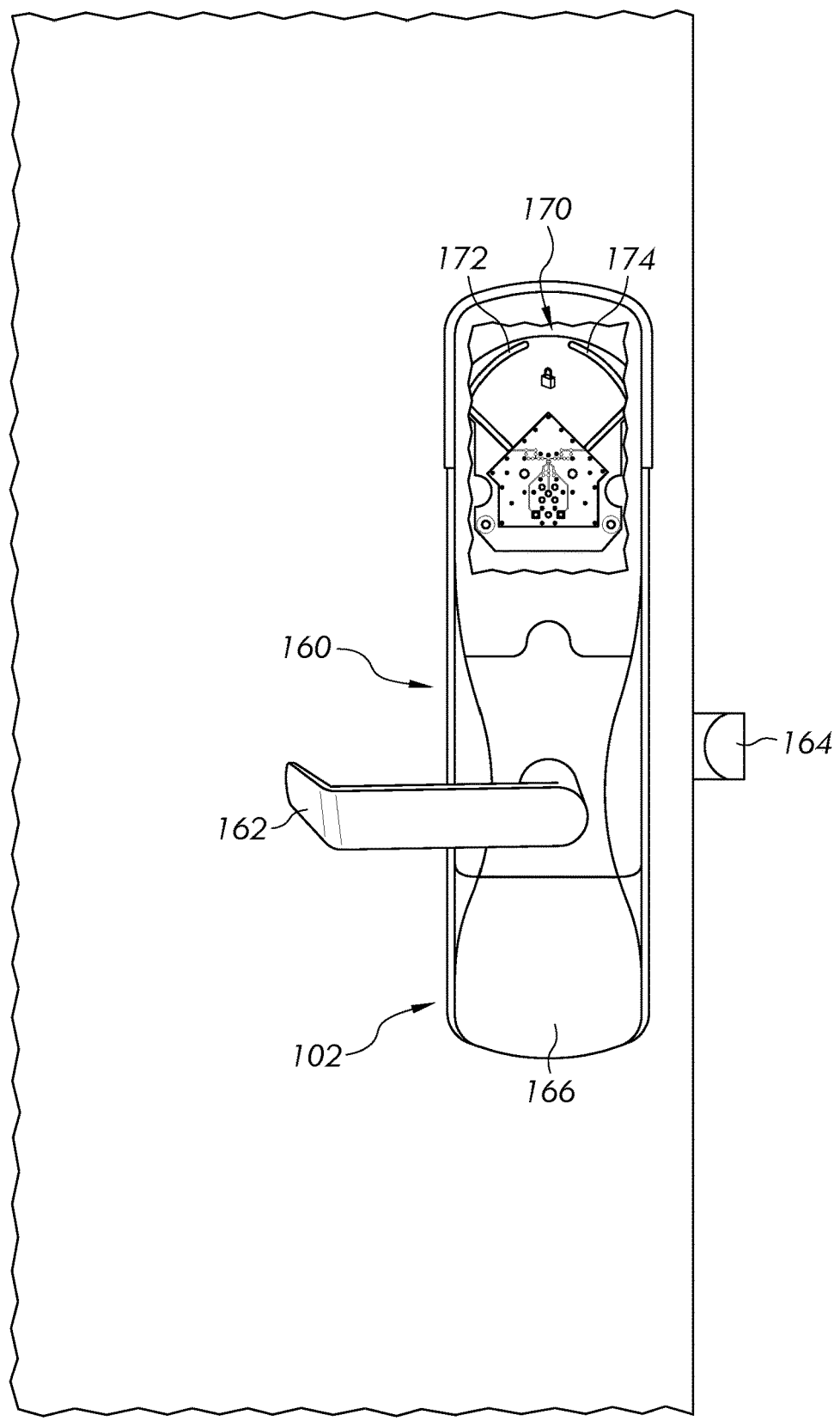
FIG. 5 is a diagram of a lock device coupled to a door.

FIG. 5 illustrates one embodiment of the lock device 102 coupled to a door 160. The lock device 160 supports a handle 162 which when moved with respect to the door 160 operates a latch 164, as is understood by those skilled in the art. The lock device 160 includes a housing 166, a portion of which is removed to show a transceiver 170 which includes a first antenna 172 and a second antenna 174. See also FIGS. 6 and 7 for antennas 172 and 174.

By incorporating at least a first and second antenna into the transceiver 170, multi-path interference from door and hall passages, personnel, and architectural construction, which limits the effective range of communication between transceivers, is overcome. By providing multiple antennas at the transceiver 170, a more robust antenna system is provided which improves the wireless communication range and which also maintains or exceeds existing performance while reducing the package size of the antenna system.

The RF signals being transmitted by the interface module 16, if there is no clear line-of-sight between the transmitter and receiver, may reach the receiver of the transceiver 170 from multiple paths. RF signals reaching the receiver via multiple paths will be out of phase with each other and cause the multi-path distortion. The disclosed door lock system overcomes the problems inherent in multi-path distortion caused by the location of locks relative to interface modules, which distortion can change dynamically as individuals move within a structure and when doors are opened and closed.

The present disclosure utilizes antenna diversity, or the use of multiple antennas, generally in close proximity to each other, and in some embodiment within a housing of the door lock, to receive a signal having sufficient definition to be demodulated. A software algorithm is configured to minimize the amount of information needed from the preamble to determine which antenna has the better reception. Since less information from the preamble is needed, the processor overhead is reduced so that there is a minimal effect on additional power consumption, thereby maintaining battery life. The multiple antennas are placed in different locations and/or orientations with firmware configured to sense which antenna has a better reception signal strength and to automatically switch to the antenna having the best signal.

In systems that have a single antenna at a door lock system, the installer often tries to locate the interface module at the margins of acceptable reception and transmission. In so doing, a lock on the RF signal at the margins can often be received more strongly, but such reception can disrupt the reception of another lock or even multiple locks in the system. Since, in one embodiment, the system can support sixteen (16) locks per interface module, multiple antennas at a single door lock reduces the difficulty in locating the interface modules, so that all the locks have reliable communication.

When the installer is checking for communication link reliability with a wireless portable reader (WPR), the installer expects that if the WPR shows reliable communication at a certain place, then the lock will also have the same reliable communication in the general vicinity. This is not always the case, however, because holding the WPR in the general area where a lock is to be installed does not always guarantee that the lock will not be placed at a null location. Antenna diversity reduces the likelihood of this placement, by providing a lock with two or more uncorrelated antennas for reception. This decreases the amount of service calls needed by the customer.

Battery life is also improved when utilizing antenna diversity because the existence of a robust communication link reduces the number attempts to communicate, and fewer retransmissions result, which conserves power.

In addition, a system having door locks, each of which utilizes two or more antennas, which are selected based on signal quality and/or strength, effectively provides a multiple position antenna system for each wireless electronic door lock. Consequently, even though the door lock is not subject to multipath interference such as is experienced by mobile phones on the move, the disclosed door lock adapts to a building structure that provides a significant dynamic multipath environment, even though the door lock is relatively stationary.

Figure 6:
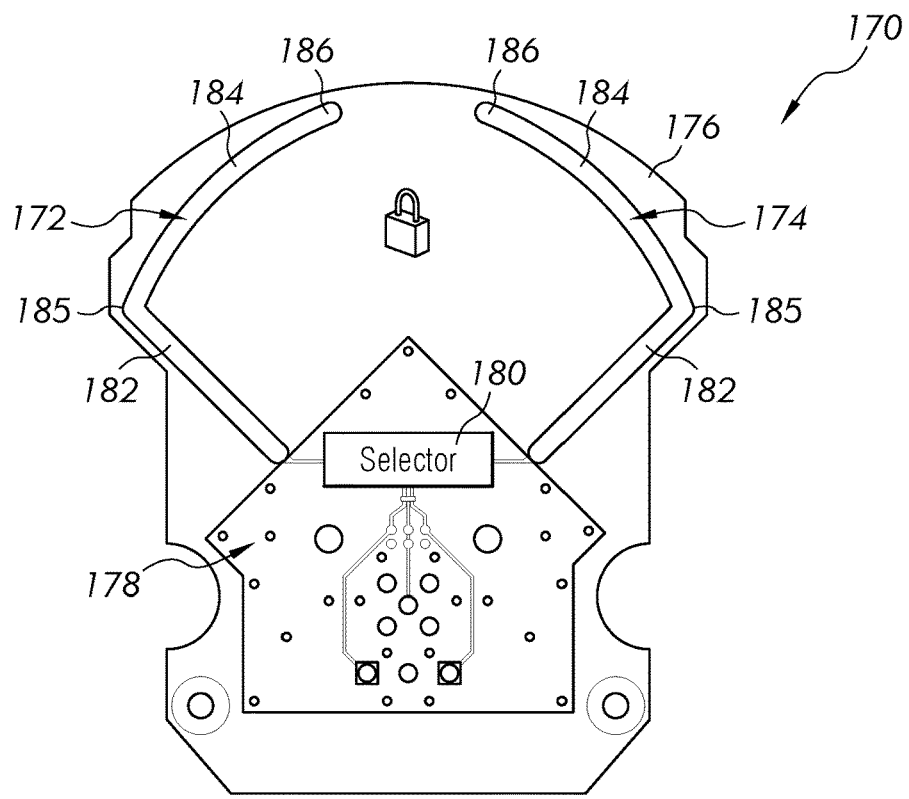
FIG. 6 is a schematic diagram of one embodiment of a transceiver.

As seen in FIG. 6, the transceiver 170 includes a circuit board 176 adapted to support circuitry or function components 178 coupled to the first antenna 172 and the second antenna 176. Each of the first antenna 172 and 174 are monopole antennas which are coupled to the circuitry 178 through a selector 180. The first and second antennas 172 and 174 are not limited to monopole antennas. In other embodiments, one or both of the antennas are of another type including microstrip and planar inverted-F antennas. The selector 180 electrically connects one or the other of the first antenna 172 and the second antenna 174 to the circuitry 178. In this configuration, each of the antennas 172 and 174 acts separately from the other antenna as a standalone antenna. Depending on the output of the selector 180, only one of the antennas 172 and 174 is electrically coupled to the circuit 178 at a time.

Each of the antennas 172 and 174 are mirror images of the other such that while the structure of each is the same, the orientation is mirrored. In one embodiment, each of the antennas 172 and 174 are configured as a circuit board trace which are formed by etching. Other embodiments include the deposition of conductive material on the circuit board or the placement of a physical wire either fixed to the surface of the circuit board or placed in a channel formed in the circuit board.

Each of the first antenna 172 and the second antenna 174 includes a generally straight first portion 182 extending along the circuit board at a generally ninety (90) degree angle with respect to each other. At an end 185 of each of the first portions 182, a second portion 184 extends at about a ninety (90) degree angle with respect to the first portion 182. Each of the second portions 184 includes terminating ends 186. Each of the second portions 184 are separated from one another by an expanse of the circuit board not supporting any traces, conductors, or components. In this embodiment, each of the antennas are oriented on the same plane and spaced a physical distance apart. In other embodiments, each of the antennas differs in mounting orientation, or polarization, relative to the circuitry 178.

Figure 7:
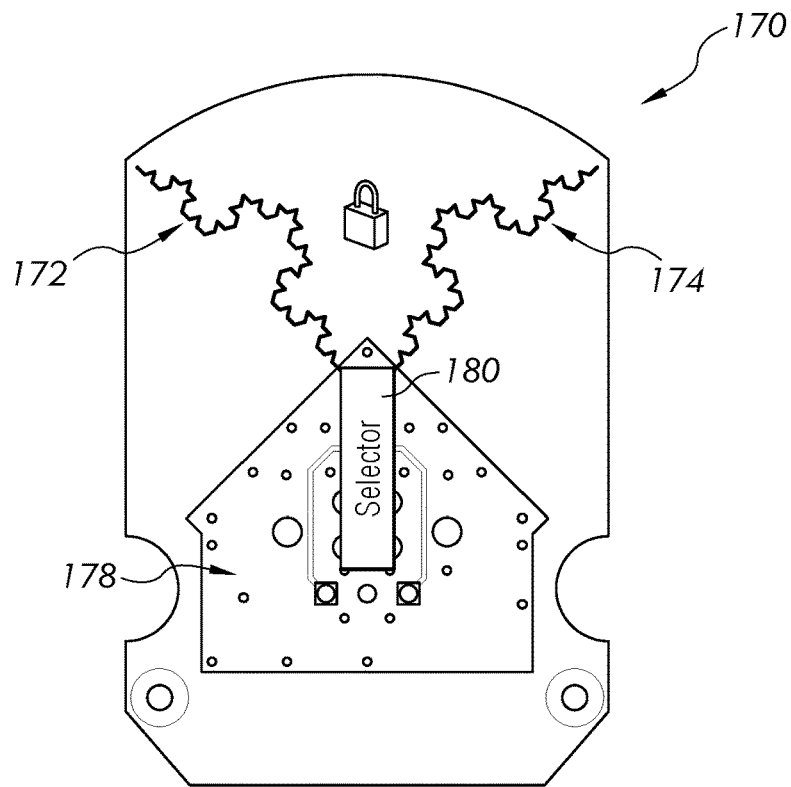
FIG. 7 is a schematic diagram of one embodiment of a transceiver.

FIG. 7 illustrates another embodiment of the transceiver 170 including the first antenna 172, the second antenna 174, circuit 178, and selector 180. In this embodiment, the first antenna 172 and the second antenna 174 are each a fractal antenna, so named after the geometric pattern and which are used to "fold the antenna" on itself. Other shapes of monopole antennas are also possible. The fractal antenna is a reduced size version of a quarter wavelength antenna. In this embodiment, each of the antennas are oriented on the same plane and spaced a physical distance apart. In one embodiment, the antennas 172 and 174 are fractal Koch antennas.

In other embodiments, the first and second antennas 172 and 174 are placed at the same location but are at different orientations or different polarizations with respect to each other.

Figure 8:
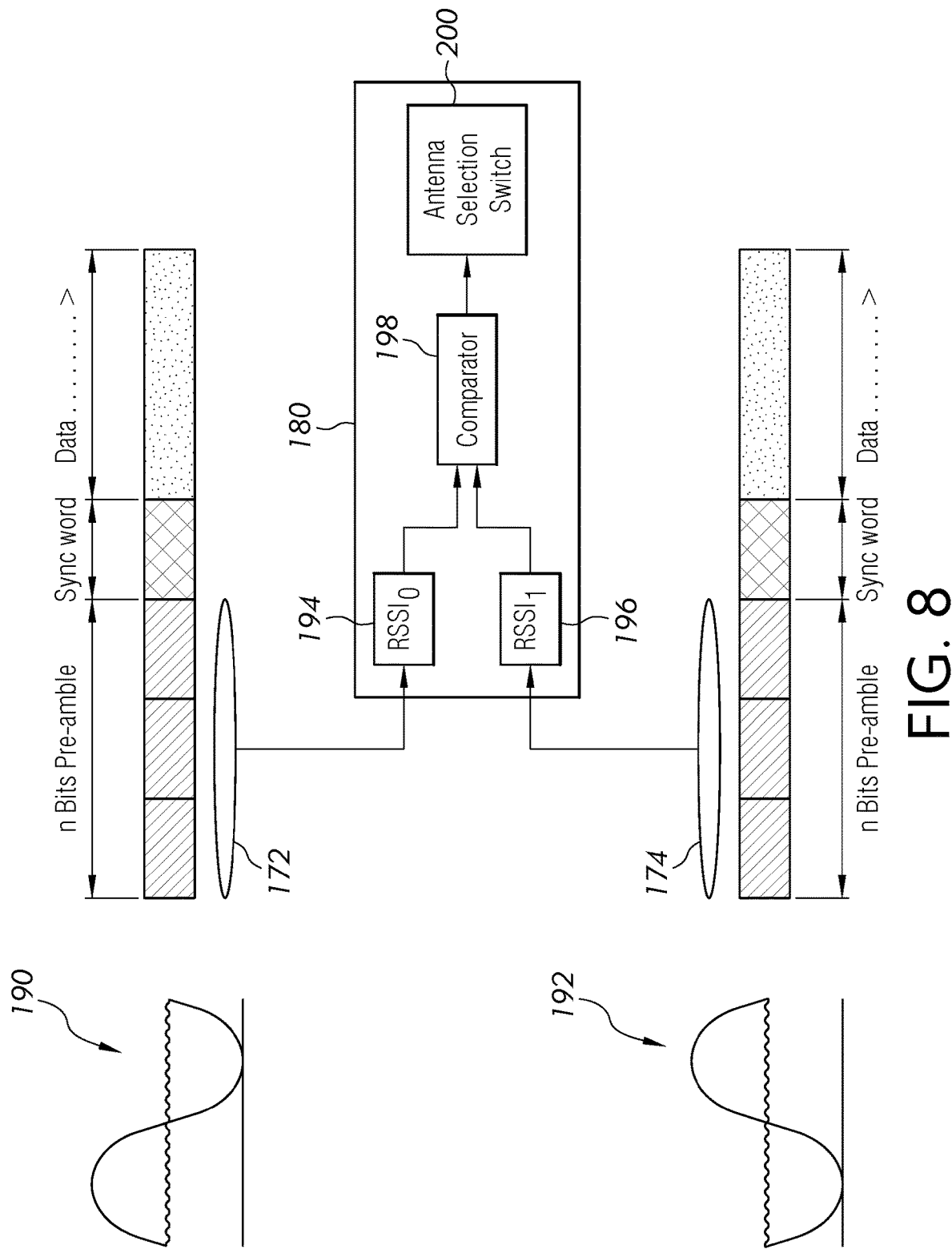
FIG. 8 is a schematic diagram of the reception of a first signal and a second signal by a first antenna and a second antenna.

FIG. 8 illustrates a schematic diagram of the reception of a first signal 190 and a second signal 192 respectively by each of the first antenna 172 and the second antenna 174. Each of the first signal 190 and the second signal 192 includes data having a defined structure which includes an n bit preamble, a sync word, and data. The illustration is representational of each of the signals 190 and 192 and in other embodiments, the signals are analog or digital signals having different arrangements of frequency, modulation, phase, preambles, sync, and data packets are possible. Each of the antennas 172 and 174 receives signals which travel along multiple paths within the building structure and which, depending on the path taken, can be out of phase with each of other received signals resulting in a signal suffering from the multi-path distortion. To determine which of the signals received by each of the antennas is readable, the selector 180 includes a first signal strength detector 194 and second signal strength detector 196. The determined signal strength is identified as a received signal strength indication (RSSI). The signal strength detectors determine the signal strength as a function of the preamble of the received signals. In one embodiment, the strength of the preamble is determined by the number of received bits which is compared to known preamble bits sequences. In another embodiment, the strength is determined by a signal strength value measured in decibel-milliwatts (dBm).

The measured strength values are compared at a comparator 198 which determines which of the received signals is greater in strength. The comparator 198 generates and provides an indicator identifying the preferred signal to a switch 200, which selects the antenna receiving the preferred signal. The signal having the best signal quality and/or strength is then further processed to determine the content of the sync word and the data.

Figure 9:
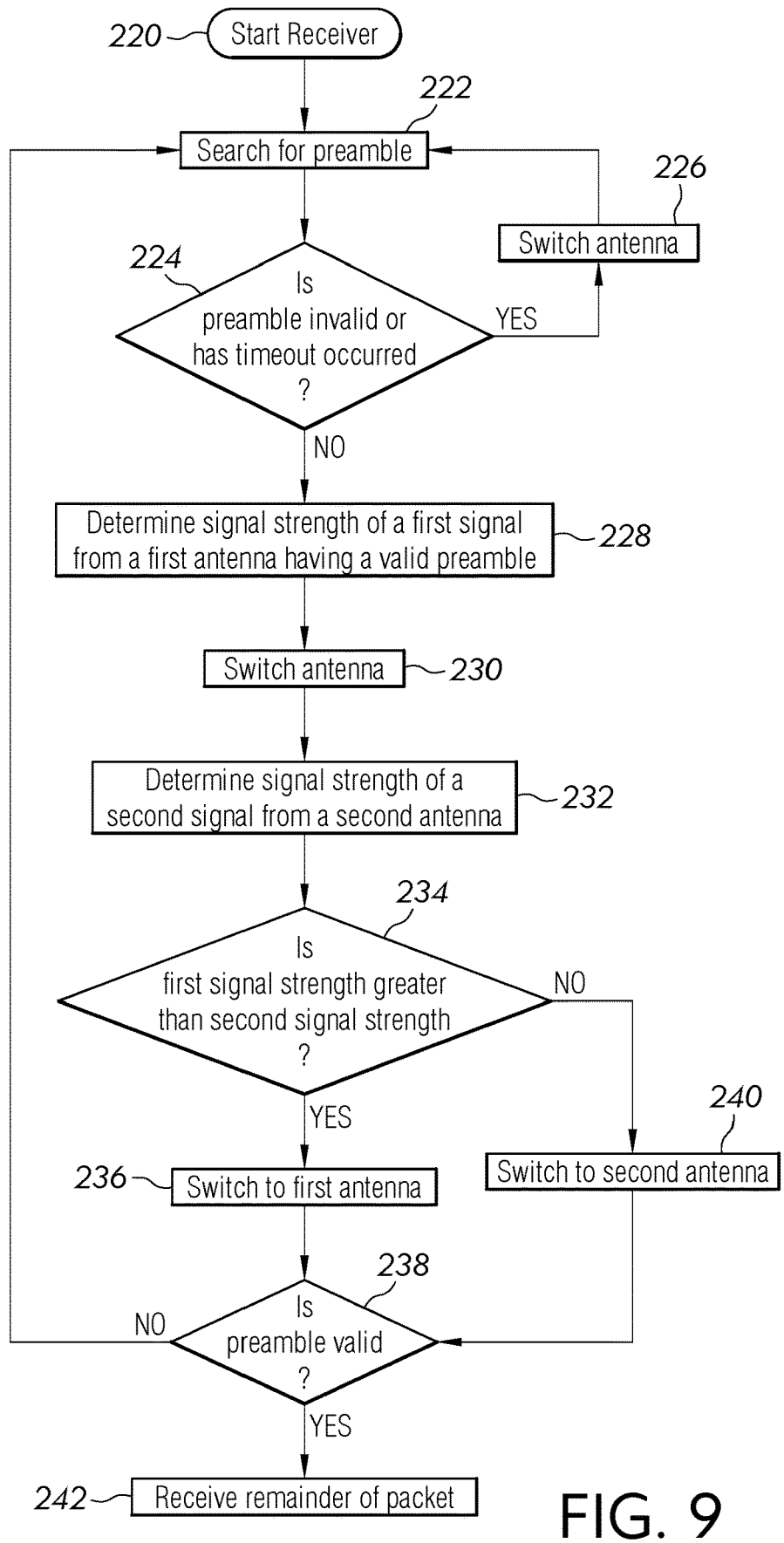
FIG. 9 is a block diagram of a process to select one of multiple antennas to pass a signal to a selector.

The processor 108 is configured to process the received signals based on a set of instructions located in firmware or in memory. As illustrated in FIG. 9, the transceiver 150 recognizes a wakeup signal at block 220 and begins to search for signals being transmitted by the interface 16. At block 222, the receiver searches for a preamble of a signal being received at only one of the antennas, for instance antenna 172. Once a preamble is found on the received signal, the receiver determines at block 224 whether the preamble is invalid or whether the preamble is not recognizable with a predetermined amount of time. If the outcome is yes, the receiver switches to the other antenna, for instance antenna 174 at block 226. Once switched, a preamble for the signal received is searched for at block 222. If the preamble is valid for the signal appearing at either one of the antennas, then the signal strength of the signal having the recognized preamble is determined at block 228. In this example, is it assumed that the signal having the recognizable preamble is received at the first antenna 172. The value of the signal strength is then stored in the memory of the memory and logic module 142.

After determining the signal strength, the receiver switches to the other antenna, the second antenna 174 in this example, at block 230. Once switched, the signal strength of the signal received by the second antenna is determined at block 232. In this embodiment, the first and second signals include the same content (i.e. the same preamble, the same sync word, and the same data) but vary in signal strength. The signal strength of the second signal is then stored in the memory and logic module 142.

Once the signal strengths have been determined, the first signal strength is compared to the second signal strength at block 234 to determine if the first signal strength is stronger. If the first signal strength is stronger, the selector 180 selects the first antenna at block 236. The received signal is re-verified to include a valid preamble at block 238. If, however, the first signal strength was not stronger than the second signal strength, the selector selects to the second antenna at block 240. Once the second signal is received, the second signal is re-verified to determine if the preamble is valid at block 238. If the preamble is verified for either of the first signal and the second signal, the remainder of the packet is received at block 242. During this process, dynamic switching between antennas occurs to determine which signal is more acceptable. If, however, one or both of the preambles is not verified, the process for determining the content of a received signal returns to block 222.

Because the door moves between open and closed positions and all points in between, the use of multiple antennas improves the working range of the electronic door lock should the interface module 16 transmit instructions while the door is located at any one of the possible locations. Incorporating multiple antennas in a wireless electronic door lock provides a working range significantly more consistent and repeatable, which results in better and more reliable communication with the door lock.

It is contemplated that the various aspects, features, computing devices, processes, and operations from the various embodiments may be used in any of the other embodiments unless expressly stated to the contrary.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method of operating an electronic door lock installed to a door, the electronic door lock including a housing located on a first side of the door, the method comprising:
   determining a first received signal strength of a first received signal, wherein the first received signal is wirelessly received via a first antenna located within the housing;
   determining a second received signal strength of a second received signal, wherein the second received signal is wirelessly received via a second antenna located within the housing, and wherein the first antenna and the second antenna are coplanar and arranged in a mirrored orientation relative to one another;

comparing the first signal strength and the second signal strength to determine which of the first signal strength or the second signal strength is a greater signal strength;

selecting the one of the first antenna or the second antenna that provides the greater signal strength; and determining information of a wireless transmission received via the selected antenna.

2. The method of claim 1, wherein the electronic door lock further comprises a processor and a switch operable to selectively connect the processor to each of the first antenna and the second antenna, and wherein the method further comprises operating the switch to connect the processor to the selected antenna.

3. The method of claim 1, wherein the wireless transmission is a repeating wireless transmission that is transmitted in at least three iterations, wherein receiving the first wireless signal comprises receiving one iteration of the repeating wireless transmission, wherein receiving the second wireless signal comprises receiving an additional iteration of the repeating wireless transmission, and wherein receiving the wireless transmission comprises receiving a further iteration of the repeating wireless transmission.

4. The method of claim 3, wherein each iteration of the repeating wireless transmission comprises a preamble and a data sequence, wherein receiving the first wireless signal comprises receiving at least the preamble of the one iteration via the first antenna, wherein receiving the second wireless signal comprises receiving at least the preamble of the additional iteration via the second antenna, and wherein receiving the wireless transmission comprises receiving at least the data sequence of the further iteration via the selected antenna.

5. The method of claim 1, wherein the first received signal comprises a first preamble, wherein the second received signal comprises a second preamble, wherein determining the first received signal strength comprises comparing the first preamble to a known preamble, and wherein determining the second received signal strength comprises comparing the second preamble to the known preamble.

6. The method of claim 1, wherein the first received signal strength is greater than the second received signal strength, wherein the first received signal comprises a preamble and a data sequence, wherein the determining the first received signal strength is based at least in part upon a signal strength of the preamble, and wherein the determining information comprises determining information of the data sequence.

7. The method of claim 1, wherein the first received signal comprises a first preamble and the second received signal comprises a second preamble;

wherein determining the first received signal strength comprises determining the first received signal strength as a function of the first preamble; and wherein determining the second received signal strength comprises determining the second received signal strength as a function of the second preamble.

8. The method of claim 7, wherein determining the first received signal strength comprises:

determining received bits of the first preamble; and comparing the received bits of the first preamble to one or more known preamble bits sequences.

9. A method of operating an electronic door lock installed to a door, the electronic door lock including a housing located on a first side of the door, the method comprising:

receiving, by a processor of the electronic door lock and via a first antenna located within the housing, a first wireless signal;

determining, by the processor, a first received signal strength of the first wireless signal;

operating a switch of the electronic door lock to connect the processor to a second antenna located within the housing, wherein the first antenna and the second antenna are coplanar and arranged in a mirrored orientation relative to one another;

receiving, by the processor and via the second antenna, a second wireless signal;

determining, by the processor, a second received signal strength of the second wireless signal;

determining, by the processor, a greater signal strength of the first signal strength and the second signal strength;

selecting, by the processor, one of the first antenna or the second antenna based upon which of the first antenna and the second antenna provides the greater signal strength; and connecting the processor to the selected antenna via the switch.

10. The method of claim 9, wherein the first wireless signal comprises a first preamble, wherein the second wireless signal comprises a second preamble, and wherein the method further comprises:

determining, by the processor, that the first preamble is valid; and determining, by the processor, that the second preamble is valid.

11. The method of claim 10, wherein determining the first received signal strength of the first wireless signal comprises determining the first received signal strength of the first wireless signal in response to determining that the first preamble is valid; and wherein determining the second received signal strength of the second wireless signal comprises determining the second received signal strength of the second wireless signal in response to determining that the second preamble is valid.

12. The method of claim 9, wherein the first wireless signal comprises a first preamble and the second wireless signal comprises a second preamble;

wherein determining the first received signal strength of the first wireless signal comprises determining the first received signal strength of the first wireless signal as a function of the first preamble; and wherein determining the second received signal strength of the second wireless signal comprises determining the second received signal strength of the second wireless signal as a function of the second preamble.

13. The method of claim 12, wherein determining the first received signal strength of the first wireless signal comprises:

determining received bits of the first preamble of the first wireless signal; and comparing the received bits of the first preamble of the first wireless signal to one or more known preamble bits sequences.

14. An electronic door lock, comprising:

a housing configured for mounting to a first side of a door;

a first antenna located within the housing;

a second antenna located within the housing, wherein the first antenna and the second antenna are coplanar and are symmetric about an axis;

a controller selectively connected to the first antenna and the second antenna via a switch, wherein the controller is configured to execute stored program instructions to:

determine a first signal strength of a first wireless signal received via the first antenna;

determine a second signal strength of a second wireless signal received via the second antenna;

compare the first signal strength to the second signal strength to determine a greater signal strength of the first signal strength and the second signal strength;

select one of the first antenna or the second antenna based upon which of the first antenna or the second antenna corresponds to the greater signal strength; and determine information of a wireless transmission received via the selected antenna.

15. The electronic door lock of claim 14, wherein the controller is further configured to execute stored instructions to:

determine that a preamble of the first wireless signal is valid; and determine the first signal strength of the first wireless signal in response to determining that the preamble of the first wireless signal is valid.

16. The electronic door lock of claim 14, wherein the controller is further configured to execute stored instructions to:

select the one of the first antenna or the second antenna corresponding to the greater of the first signal strength or the second signal strength; and operate the switch to connect the wireless receiver to the selected one of the first antenna or the second antenna.

17. The electronic door lock of claim 14, wherein each of the first wireless signal and the second wireless signal comprises a preamble and a data sequence; and wherein to determine information of a wireless transmission received via the selected antenna comprises determining the data sequence of the one of the first wireless signal or the second wireless signal received via the selected antenna.

18. The electronic door lock of claim 14, wherein the first wireless signal comprises a first preamble and the second wireless signal comprises a second preamble;

wherein to determine the first signal strength comprises to determine the first signal strength as a function of the first preamble; and wherein to determine the second signal strength comprises to determine the second signal strength as a function of the second preamble.

19. The electronic door lock of claim 18, wherein to determine the first signal strength comprises to (i) determine received bits of the first preamble and (ii) compare the received bits of the first preamble to one or more known preamble bits sequences.

20. The electronic door lock of claim 14, wherein the first antenna includes a first portion and a second portion that extends angled relative to the first portion; and wherein the second antenna includes a third portion and a fourth portion that extends angled relative to the third portion.

21. The electronic door lock of claim 14, wherein each of the first antenna and the second antenna comprises one of a monopole antenna or a fractal antenna.

* * * * *